May 28, 1946.  W. J. URBAN  2,401,204
PALLET AND WEAR LUG THEREFOR
Filed March 11, 1944  2 Sheets-Sheet 2
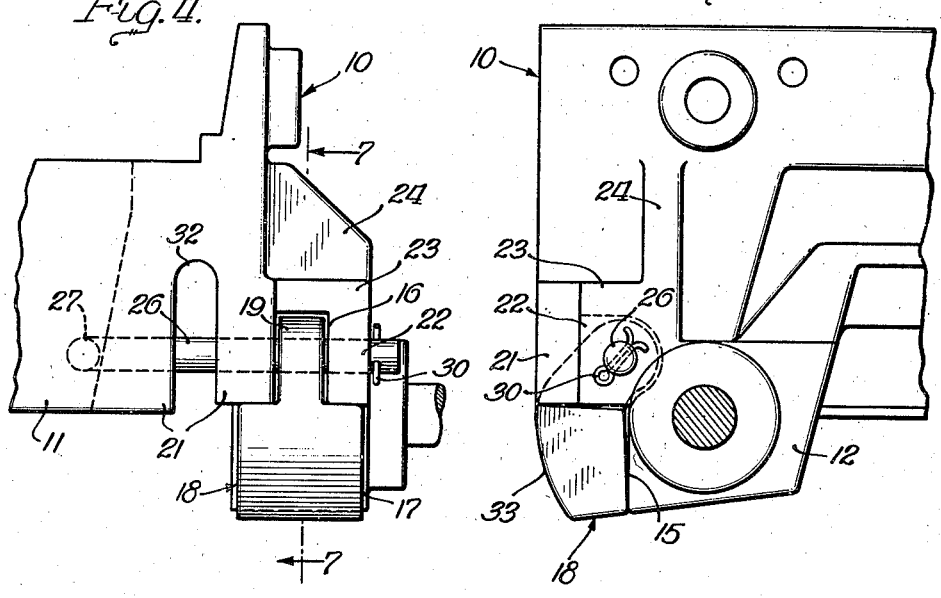
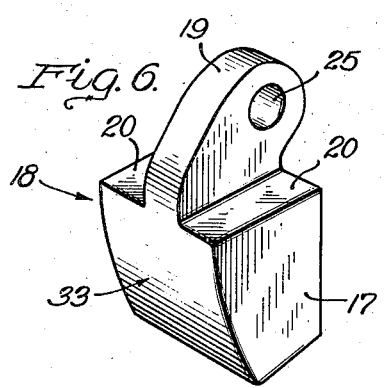
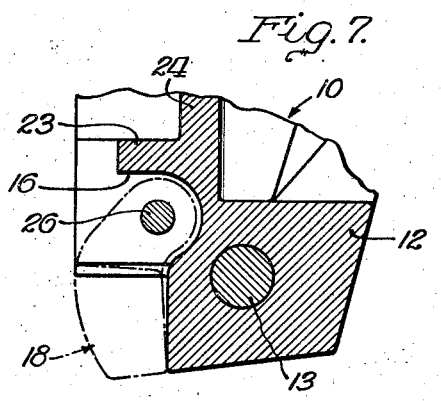
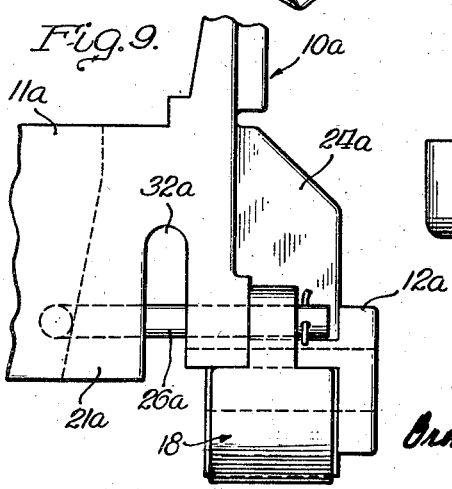
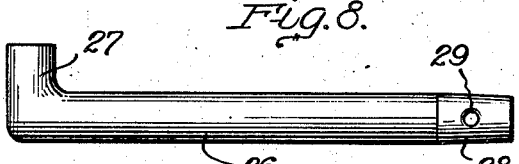
INVENTOR.
William J. Urban
BY
*Attys.*

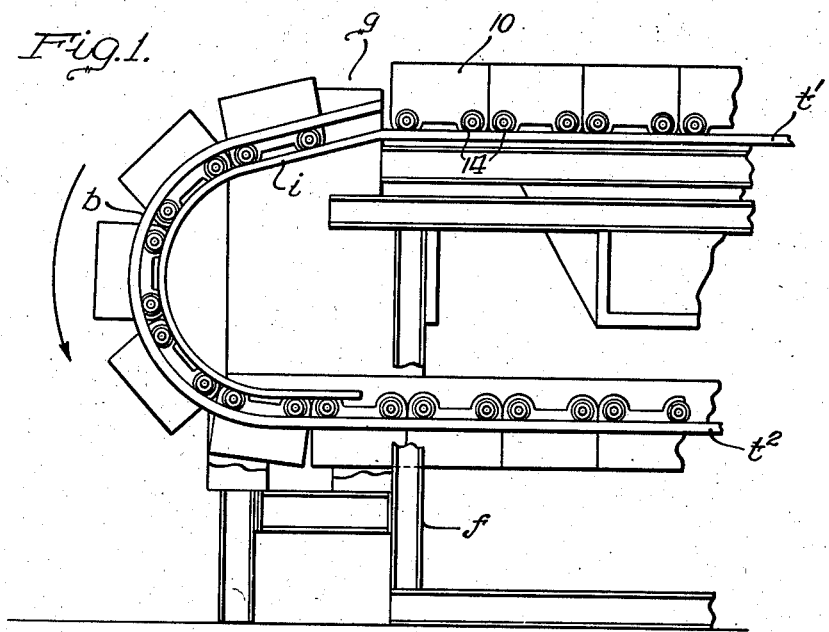
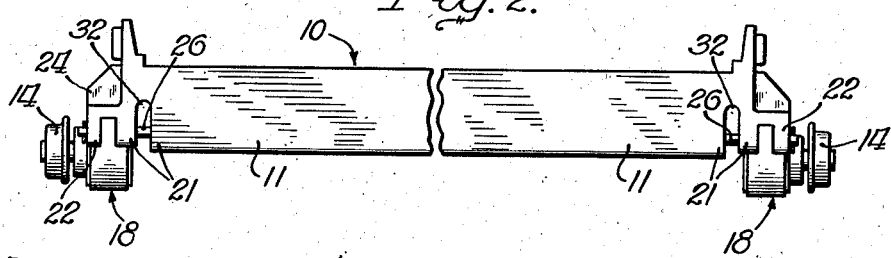
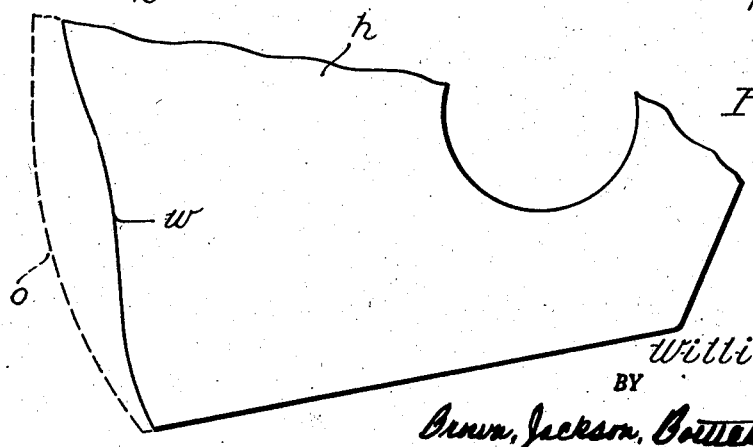

Patented May 28, 1946

2,401,204

UNITED STATES PATENT OFFICE 2,401,204

PALLET AND WEAR LUG THEREFOR

William J. Urban, Glen Ellyn, Ill., assignor to American Ore Reclamation Company, Chicago, Ill., a corporation of New York Application March 11, 1944, Serial No. 526,068

5 Claims. (Cl. 198—108)

This invention relates to pallets intended for use in sintering machines, and has to do with pallets of the character referred to having wear resisting areas presenting surfaces highly resistant to wear and effective for preventing, or materially reducing, wear of the pallets at the areas thereof subjected to rubbing contact in the travel of the pallets along the track of the sintering machine, particularly during travel of the pallets about the return bend at the discharge end.

The pallet of my invention is particularly suitable for use in continuous sintering machines, such as the Dwight & Lloyd type of sintering machine, now well known in this art. In such machine the pallets travel in a train, with the pallets in endwise abutting relation, along an endless track comprising upper and lower runs and return bends at the ends of the machine. The pallets are raised from the lower run, at the feed end of the machine, by means of sprockets, and thereby returned to the upper run, at the feed end, after which they are charged with the material to be sintered, pass beneath an ignition device or furnace, and are then propelled along the upper run in a continuous train, by the sprockets, over wind boxes, so that the bed of material on the continuous grate provided by the pallets is subjected to down draft combustion. Thereafter the pallets pass about the return bend at the discharge end of the machine, where the sinter is broken off and is discharged from the pallets. In Patent No. 1,764,695, issued to Edward W. Shallock, there is disclosed a sintering machine of the type referred to provided, at the upper portion of the return bend at the discharge end, with a comparatively straight inclined portion providing a gap in the train of pallets and down which the pallets successively travel, each pallet as it travels down this inclined portion striking the next preceding pallet, to assure complete discharge of the sinter from the pallet, particularly when materials containing tarry substances, or other substances which tend to cause the sinter to adhere to the pallet, are being sintered. The pallets used on the machine referred to are approximately 6 feet wide and 2 feet long, are formed of cast iron and weigh about 1400 pounds. Materials sintered on these machines frequently are highly abrasive in character, and fine particles of such materials enter, to a certain extent, between the adjacent ends of the pallets. In passing around the return bend at the discharge end of the machine the hubs of the pallets are in contact under considerable pressure, and have relative movement in opposite directions, due to the relative movement of the adjacent ends of the pallets in opposite directions about the axes of the wheels. This rubbing motion under pressure causes objectionable wear of the hubs of the pallets, and that wear is aggravated by particles of abrasive material between the contacting wheel hubs of the pallets. After the pallets have been in use on a machine for a limited time the hubs thereof become worn to a considerable extent, such as to cause a material increase in the length of the gap in the train at the inclined portion of the return bend, above referred to. The length of that gap is initially such that the travel of the pallets down the inclined portion is sufficient to assure dislodgment of the sinter, while avoiding objectionably high impact between the pallets such as might cause injury or breakage thereof. After substantial wear of the pallets has occurred, the length of the gap is materially increased, as a result of which breakage and damage to the pallets may, and in many cases has, occurred. That is objectionable not only because of breakage of pallets, but also because of the necessity for shutting down the machine during repair or replacement of broken pallets.

My invention is directed to avoiding the above referred to difficulties in sintering machines of the type referred to. More particularly, I provide means for preventing wear, or greatly reducing the rate of wear, between the contacting areas of the pallets, thereby preventing or reducing likelihood of objectionable increase in length of the gap in the train of pallets. To that end, I provide the wheel hubs of the pallets, at the contacting areas of the hubs, with relatively hard wear-resistant elements providing wear resisting surfaces at the contacting areas of the hubs in the passage of the pallets around the return bend at the discharge end of the machine. Preferably, the wear-resistant elements are in the form of removable members or lugs which may readily be removed and replaced, these lugs being secured in position by means of a character to permit ready replacement thereof without necessity for removing the pallets from the machine, thus reducing stoppage of the machine to a minimum while also, due to the wear resistant character of the lugs, assuring that such replacements will have to be made only at infrequent intervals. Further objects and advantages of my invention will appear from the detail description.

In the drawings:

Figure 1 is a semi-diagrammatic side view of the discharge end portion of a sintering machine provided with pallets embodying my invention;

Figure 2 is an end view, on an enlarged scale, of a pallet embodying my invention, partly broken away, the grates and the side retaining plates and associated parts being omitted for clearness of illustration;

Figure 3 is a fragmentary side view of a wheel hub of a known type of pallet, showing in full lines the worn outer end of the hub and indicating, in dotted lines, the original contour of that end of the hub;

Figure 4 is a fragmentary end view, on an enlarged scale, of the pallet of Figure 2;

Figure 5 is a fragmentary side view of the pallet of Figure 4;

Figure 6 is an isometric side view, on an enlarged scale, of the wear lug of the pallets of Figures 2, 4, and 5;

Figure 7 is a sectional view taken substantially on line 7—7 of Figure 4, with the wear lug omitted and indicated in dot and dash lines;

Figure 8 is a plan view of the pin for securing the lug in position; and

Figure 9 is a view similar to Figure 4 but showing a slightly different form of pallet embodying my invention.

The sintering machine shown in Figure 1 is similar to the machine disclosed in the Patent No. 1,764,695, to Edward W. Shallock, above referred to. It comprises a suitable frame f supporting an endless track having upper and lower runs t1 and t2, respectively, connected at the discharge end of the machine, by a return bend b. This return bend b is provided, at the upper portion thereof, with a comparatively straight downwardly inclined portion i providing a gap g in the train of pallets 10. The pallets are propelled along the upper run of the track and travel successively down the inclined portion i of the return bend b, each pallet striking the preceding pallet so as to dislodge the sinter, as explained. The pallets then travel around the return bend b, as indicated by the arrow, and thence along the lower run t2 of the track, by gravity, the lower run of the track being appropriately inclined downward toward the feed end of the machine for that purpose, as is known.

Present day pallets are commonly formed of cast iron with the wheel hub integral with the pallet frame. In the travel of such pallets about the return bend b at the delivery end of the machine, the wheel hubs of the pallets are in contact at areas thereof located substantially in, but usually slightly below, the horizontal plane of the wheel axes, considering the pallet in its upright position on the upper run of the track. As the pallets travel around the return bend they are continuously changing their direction of travel so that, in effect, the leading end of each pallet rocks in one direction about the common axis of the wheels at that end, and the following end rocks in the opposite direction about the axis of the wheels at the latter end. The contacting hubs of the pallets are thus subjected to rubbing action in opposite directions under considerable pressure, each of these pallets weighing approximately 1400 pounds. That causes wear of the hubs and, in many cases, this wear is accelerated by abrasive particles of the materials being sintered entering between the hubs. After pallets of this character have been in use for a period of several months, the wheel hubs have become worn to an objectionable extent, and repair thereof or replacement of the pallets, becomes necessary to assure most efficient operation of the sintering machine. That involves considerable expense in effecting necessary repairs and, which is often more serious, necessitates shutting down the sintering machine until the necessary repairs have been made or the worn pallets have been replaced, the objections to which are obvious.

In Figure 3 there is shown fragmentarily and in side view a worn wheel hub of a present day pallet such as above referred to. This view is drawn to scale and shows the hub of one of three pallets selected at random from the train of pallets of a sintering machine after approximately eight months operation. In Figure 3 the wavy full line w shows the worn outer end of hub h, and the dotted line o shows the original contour of the outer end of the hub. It will be seen that considerable wear of the outer end of the hub has occurred. It will also be seen that if six pallets, with the hubs worn to the extent shown in Figure 3, were disposed in endwise contact about the return bend b of the machine shown in Figure 1, the length of the gap g in the train of pallets would be considerably greater than the initial and intended length of such gap. Such an increase in the length of the gap in the train of pallets results in greatly increased momentum of a pallet traveling down the incline i, and this increased momentum results in damage to the pallets by excessive battering thereof and, not infrequently, by breakage of the pallets. In theory, that could be avoided by repairing the hubs of the pallets before objectionable wear has occurred but, in practice, that is seldom done due to the expense involved and, particularly, due to the necessity for shutting down the machine, above referred to.

In order to avoid the rapid wear of the wheel hubs, I provide means whereby the areas of the hubs subjected to rubbing contact are made relatively hard and wear resistant, such means being of any suitable character within the broader aspects of my invention, and preferably being such as to be readily removed and replaced. To that end, I provide frame 11 of pallet 10 with suitably formed wheel hubs 12 at each corner thereof, each of these hubs being bored for reception of a wheel axle 13 secured therein in a suitable manner, conveniently by having a pressed fit in the hub. The axles 13 have mounted thereon flanged wheels 14 which support the pallets for travel on the track of the machine. Each hub 12 is provided, at its lower outer corner, with a rectangular notch 15, it being noted that in the following description, and in the claims, the different elements of the pallet and associated parts will be described with reference to the positions which they occupy when the pallet is in its normal upright position on the upper run of the track of the sintering machine, with a view to clearness of description and avoidance of confusion. The lug 12 is further provided with a reduced slot 16 extending from the upper end of notch 15 upward and inward of hub 12 in a plane substantially normal to the bore in which the wheel axle 13 is secured. As will be noted from Figures 5 and 7, the top wall of notch 15 is disposed a short distance above the horizontal plane of the axis of axle 13.

Notch 15 receives body 17 of a wear lug 18 provided, at the transverse center of its upper end, with an upwardly and inwardly extending reduced neck 19, the top of body 17 having shoulders 20 at opposite sides of neck 19. Referring to Figure 4, it will be seen that slot 16 extends between side wall 21 of the pallet frame 11 and a downwardly extending arm 22 of an L-shaped element 23 formed integrally with a reenforcing web 24 connecting the hub 12 to end wall 21 of the pallet frame. Neck 19 of lug 18 is provided with an opening 25 adjacent its upper end. This opening is so disposed that when the body 17 of lug 18 is positioned in notch 15, in contact with the outer end portion of the top wall thereof and the lower end portion of the inner wall of this notch, with neck 19 extending into slot 16, opening 25 is slightly out of alignment with coaxial openings in arm 22 and end wall 21 of the pallet frame 11. The latter openings receive a securing pin 26 provided at its inner end with an angularly disposed stop finger 27 and having its outer end portion slightly tapered at 28. This outer end portion of pin 26 is provided with a diametrical opening 29 for reception of a cotter pin 30. It will also be noted, from Figures 5 and 7, that the shoulders 20 and the inner face of body 17 of lug 18 are slightly inclined, such that the body of the lug contacts the top wall of the notch 15 at the outer areas thereof only, and contacts the inner wall of this notch at the lower areas only thereof. In applying the lug, it is positioned in notch 15 in the manner stated, and the pin 26 is then inserted through end wall 21 of the pallet frame 11, from the inner face of that wall, the tapered end portion 28 of this pin entering opening 25 in neck 19 of the wear lug. Pin 26 is then forced outward through opening 25 and through the opening in arm 22, after which the cotter pin 30 is inserted through opening 29. As pin 26 is forced through opening 25 it exerts a wedging action which draws the body 17 of lug 18 into tight contact with the outer and lower corner areas of the upper and inner walls, respectively, of notch 15, the lug thus having a three point mounting. That is advantageous in that it accommodates any normal roughness or inaccuracy in the casting of the pallet frame, as well as any slight inaccuracies in the casting of the lug 18, when a cast lug is used, avoiding necessity for accurate machining of parts, such as would be required if the lug seated against the upper and the inner walls of notch 15 for the full extent of such walls. Due to the wedging effect exerted by the pin 26, the lug is tightly secured in position in notch 15 in a manner to be effectively held against movement relative to wheel hub 12. Referring to Figure 4, the side wall 22 of pallet frame 11 is provided with a downwardly opening vertical slot 32 across which the pin 26 extends, this slot being intended for reception of the usual seal bar (not shown) through which pin 26 passes for retaining this bar in position.

When the lug 18, which is formed of hard steel or other suitable hard material resistant to wear, is mounted in notch 15, the outer end surface 33 of this lug, which is curved from top to bottom on an arc, is substantially concentric with the axis of axle 13 and, at its upper end, is tangent to the straight end surface of side wall 21 of pallet frame 11, merging smoothly into that surface. The lugs 18 thus provide wear resistant surfaces disposed in the areas of the wheel hubs subjected to rubbing contact in the passage of the pallet about the return bend b at the discharge end of the sintering machine. Due to the great resistance to wear of the lugs 18, compared to cast iron, pallets equipped with these lugs may be used for a much greater length of time without requiring attention than present day pallets of cast iron having the wheel hubs thereof also of cast iron at the areas of such hubs which have rubbing contact. When the lugs 18 become worn to an appreciable extent, they may readily be removed by withdrawing the securing pins 26, and as readily replaced by unworn lugs. That avoids necessity for any shut-down of the sintering machine for an appreciable length of time in order that necessary repairs to the pallets may be made or that worn pallets may be replaced. The worn lugs thus removed from the pallets may readily be repaired by welding, or in any other suitable manner, and can then again be placed back in service.

In Figure 9 I have shown my invention as applied to a pallet of present day construction above referred to. Side walls 21a of frame 11a of the pallet 10a, and the wheel hub 12a, are notched out at each corner of the pallet frame to provide a notch similar to notch 15 of Figure 5, the outer face of side wall 21a being suitably faced or machined off to accommodate neck 19 of wear lug 18. This lug is secured in position by a pin 26a, as before, in tight contact with the outer end area and the lower end area of the top and the inner walls, respectively, of the notch. It will be seen that the pallet 10a is not provided with an L shaped element corresponding to element 23 of Figure 4 and, accordingly, the outer shoulder 20 of wear lug 18 does not bear against the top wall of the notch, the bearing surface at the top of the body of the lug 18 being at the inner shoulder 20 thereof only. With that exception the structure of Figure 9 is essentially the same as that of Figure 4, and further description of the form shown in Figure 9 is not thought to be necessary.

It will be understood that in the application of my invention to different forms of pallets, changes in details may be resorted to as conditions may require, and, likewise, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In a pallet intended for use in a train of similar pallets travelling in endwise contact along the upper and lower runs of a sintering machine track and about a return bend connecting said runs, a rectangular frame having at each corner a wheel hub provided with a bore for reception of an axle and with a notch in its lower outer end portion extending substantially to the horizontal plane of the axis of said bore, said hub having a slot therein extending from said notch, a relatively hard wear resistant lug having a body seating in said notch and a reduced neck extending into said slot, and means securing said neck in said slot, the body of said lug presenting a wear resisting surface at the outer end of said hub substantially concentric with said bore.

2. In a pallet intended for use in a train of similar pallets travelling in endwise contact along the upper and lower runs of a sintering machine track and about a return bend connecting said runs, a rectangular frame having at each corner a wheel hub provided with a bore for reception of an axle and with a notch in its lower outer end portion extending substantially to the horizontal plane of the axis of said bore, said hub having a slot therein extending from said notch, a relatively hard wear resistant lug having a body seating in said notch and a reduced neck extending into said slot, and means securing said neck in said slot, the body of said lug presenting a wear resisting surface at the outer end of said hub substantially concentric with said bore and having its upper end substantially tangent to the outer end of said hub.

3. In a pallet intended for use in a train of similar pallets travelling in endwise contact along the upper and lower runs of a sintering machine track and about a return bend connecting said runs, a rectangular frame having at each corner a wheel hub provided with a bore for reception of an axle and with a notch in its lower outer end portion extending substantially to the horizontal plane of the axis of said bore, said hub having a slot therein extending from said notch upward and inward of said hub in a plane substantially normal to said bore, a relatively hard wear resistant lug having a body seating in said notch and a reduced neck extending into said slot, and a securing pin passing through said hub and said neck, the body of said lug presenting a wear resisting surface at the outer end of said hub substantially concentric with said bore.

4. In a pallet intended for use in a train of similar pallets travelling in endwise contact along the upper and lower runs of a sintering machine track and about a return bend connecting said runs, a rectangular frame having at each corner a wheel hub provided with a bore for reception of an axle and with a substantially rectangular notch in its lower outer end portion extending substantially to the horizontal plane of the axis of said bore, said hub having a recess therein extending upward and inward from said notch in a plane substantially normal to said bore, a relatively hard wear resistant lug having a body substantially conforming to said notch and a reduced neck extending into said recess with the body contacting the walls of said notch, and a securing pin passing through said hub and said neck, the body of said lug presenting a wear resisting surface at the outer end of said hub substantially concentric with said bore.

5. In a pallet intended for use in a train of similar pallets traveling in endwise contact along the upper and lower runs of a sintering machine track and about a return bend connecting said runs, a rectangular frame having at each corner a wheel hub provided with a bore for reception of an axle and with a substantially rectangular notch in its lower outer end portion extending substantially to the horizontal plane of the axis of said bore, said hub having a slot therein extending upward and inward from said notch in a plane substantially normal to said bore, a relatively hard wear resistant lug having a body substantially conforming to said notch and provided intermediate the sides of its top with a reduced neck extending into said slot providing at opposite sides of said neck shoulders at the top of said body, said shoulders being inclined downward and inward of said notch and contacting the outer portion only of the top wall thereof and the inner end of said lug being inclined downward and inward of said notch and contacting the lower portion only of the inner wall thereof, and a securing pin passing through said hub and said neck, the body of said lug presenting a wear resisting surface at the outer end of said hub substantially concentric with said bore.

WILLIAM J. URBAN.